United States Patent
Lefebvre et al.

(10) Patent No.: US 6,768,491 B2
(45) Date of Patent: Jul. 27, 2004

(54) BARYCENTRIC CENTROID SAMPLING METHOD AND APPARATUS

(75) Inventors: Laurent Lefebvre, Framingham, MA (US); Larry Seiler, Boylston, MA (US)

(73) Assignee: ATI Technologies Inc., Markham (CA)

( * ) Notice: Subject to any disclaimer, the term of this patent is extended or adjusted under 35 U.S.C. 154(b) by 172 days.

(21) Appl. No.: 10/036,782

(22) Filed: Dec. 21, 2001

(65) Prior Publication Data

US 2003/0117409 A1 Jun. 26, 2003

(51) Int. Cl.[7] .................................................. G09G 5/00
(52) U.S. Cl. ........................ 345/581; 345/613; 345/626
(58) Field of Search ................................. 345/563, 581, 345/606, 613, 626, 672, 694–696, 799, FOR 103, FOR 168, FOR 171, FOR 219; 348/264, 661, 841

(56) References Cited

U.S. PATENT DOCUMENTS

2002/0097241 A1 * 7/2002 McCormack et al. ....... 345/423

* cited by examiner

Primary Examiner—Kee M. Tung
Assistant Examiner—G F. Cunningham
(74) Attorney, Agent, or Firm—Vedder, Price, Kaufman & Kammholz, P.C.

(57) ABSTRACT

A method and corresponding apparatus for calculating the centroid of a fragment to be rendered is disclosed. The method calls for moving the sampling point of a pixel from its initial center point to the center of the fragment containing a portion of an image to be rendered. The method comprises the steps of receiving a coverage mask containing at least one sample point of the pixel fragment under consideration; determining which of the sample points are within the fragment; determining a value representative of the number of sample points that are within the fragment; determining offset values of the fragment centroid based on the number of sample points within the fragment; and determining the barycentric coordinates of the centroid of the fragment. The centroid of the fragment is where sampling of the primitive will occur. By sampling at the centroid of the fragment, rendered image quality is improved due to the reduced anti-aliasing effects at the edges of the primitive.

17 Claims, 6 Drawing Sheets

| MASK VALUE | ΔX | ΔY |
|---|---|---|
| 0.   00000000 | DISCARD | DISCARD |
| 11.  00001011 | 0.12 | -0.07 |
| . . . | . . . | . . . |
| 168. 10101000 | -0.27 | -0.13 |
| . . . | . . . | . . . |
| 255. 11111111 | 0 | 0 |

BARYCENTRIC CENTROID SAMPLING METHOD AND APPARATUS

FIELD OF THE INVENTION

The present invention generally relates to graphics processing and, more particularly, to a method and apparatus for determining the centroid of an image fragment to be sampled.

BACKGROUND OF THE INVENTION

In computer graphics applications, complex shapes and structures are formed through the sampling, interconnection and rendering of more simple shapes, referred to as primitives. An example of such a primitive is a triangle. Physical attributes such as color, shading and texture are often applied to the rendered primitives to make them look more realistic.

Primitives and the attributes they possess are defined in part by the vertices thereof. Known techniques for applying attributes to a primitive include interpolating the attributes from the vertices of the primitive. Such interpolation is accomplished by sampling the plurality of pixels that comprise the primitive at their corresponding center points. The sampling is generally performed in a graphics processor by a raster engine or suitable circuitry.

The raster engine uses barycentric coordinates of the vertices of the primitives to interpolate attribute values for the individually sampled pixels. The barycentric coordinates are comprised of a weight that is applied to the respective vertex coordinates of the primitive. Each weight at a barycentric coordinate within the triangle has a value between zero and one, inclusive and the sum of the weights at each position is always one. After the raster engine has sampled the pixels, and the physical attributes applied thereto, the sampled primitive is then transferred to an image buffer. The contents of the image buffer are later displayed on a suitable display device.

A drawback associated with conventional sampling methods, occurs when using a multisampling algorithm to render an anti-aliased image. Multisampling algorithms compute attribute values at more than one position within each pixel. As a result, the center of the pixel being sampled can be located outside of the primitive present therein. In other words, the primitive to be rendered may not cover the center of the pixel. Subsequently, if the pixel is sampled without including the entirety of the fragment contained therein, artifacts may be generated in the sampled pixel. This results in the rendered image containing wrongfully colored spots at various points thereof. Consequently, sampling at the center of a pixel when the primitive lies outside the center of the pixel results in degraded rendered image quality.

Thus, there is a need for an improved sampling method and apparatus which provides for the center point of the fragment of a primitive to be rendered always being sampled notwithstanding the location within a pixel.

BRIEF DESCRIPTION OF THE DRAWINGS

The present invention and the associated advantages and features thereof, will be best understood and appreciated upon review of the following detailed description of the invention, taken in conjunction with the following drawings, where like numerals represent like elements, in which.

DETAILED DESCRIPTION OF THE INVENTION

Briefly stated, the present invention is directed to a method and apparatus for determining the centroid of a fragment before the pixel that contains such fragment (or that such fragment intersects) is sampled for later rendering. For purposes of definition, "centroid" means the center point of the fragment that is to be sampled. Based on the aforementioned definition, it is possible for the center point of a pixel that contains a fragment not to coincide with the centroid of the fragment. Thus, the present invention is directed to a method and apparatus which shifts the sampling point of a pixel from the center point thereof to the center of the fragment contained within a pixel.

The method of calculating the centroid of a fragment comprises receiving the center point of the pixel and coverage mask data including at least one sample point for the corresponding pixel; determining a coverage mask value based on the number of sample points located within the fragment; determining the offset value for the corresponding pixel based, in part, on the coverage mask value; and determining the centroid of the fragment by adding the offset values to the initial center point of the pixel.

After the fragment centroid is determined, the sampling of that pixel is conducted from that point. Sampling from the fragment centroid enhances rendered image quality by ensuring that the fragments (or primitives) that comprise the rendered image are always sampled within the fragment. This has the effect of substantially reducing or eliminating wrongfully colored pixels on a display caused by the sampling of a pixel that is not completely covered by the fragment, or where the fragment does not cover the center of the pixel that it intersects.

Figure 1:
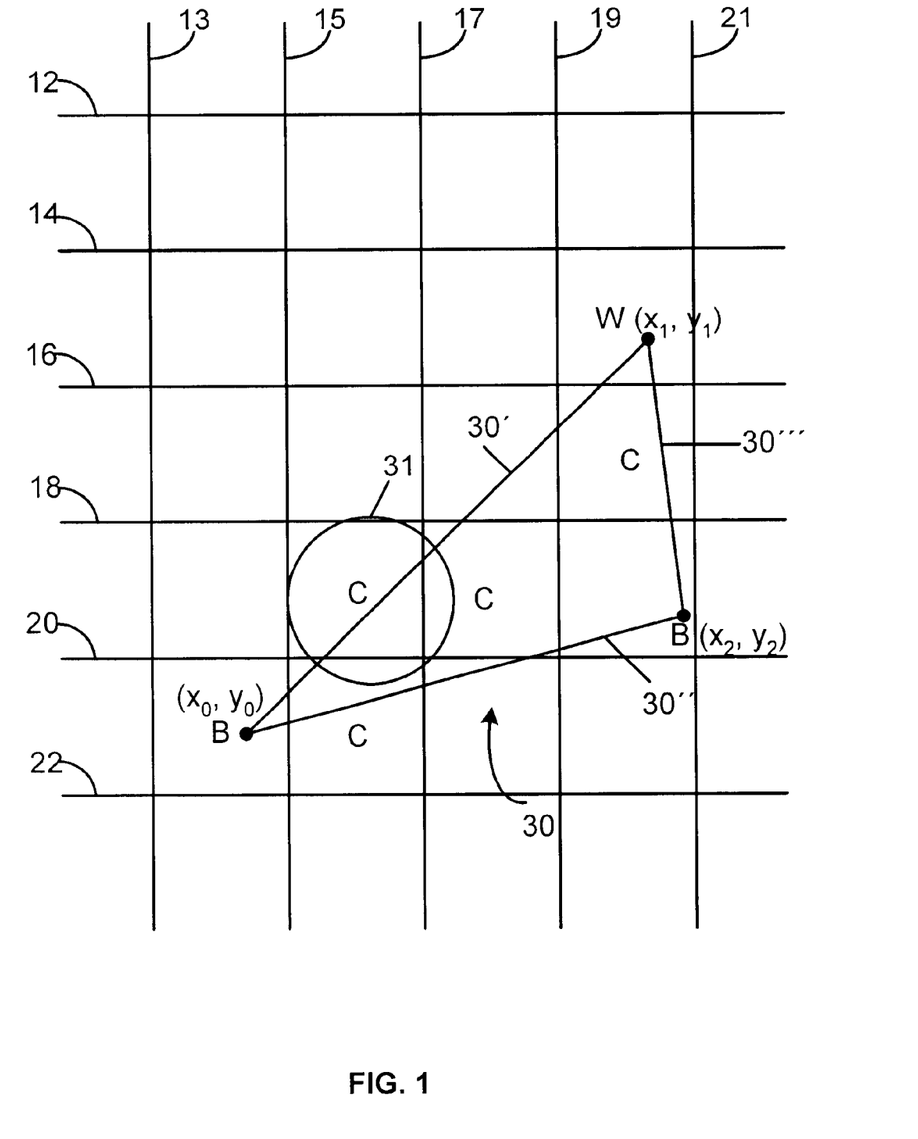
FIG. 1 is a schematic representation of a primitive being rendered onto two-dimensional space.

An exemplary embodiment of the present invention will now be described with reference to FIGS. 1–7. FIG. 1 is a schematic representation of a primitive being rendered onto a two-dimensional space, such as when an object is being rendered onto a suitable display device. The two-dimensional space is represented by grid lines 12–22. The primitive is represented as a triangle 30, bounded by line segments 30'–30'". The vertices of the triangle 30 (represented by Cartesian coordinates $X_{0-N}$, $Y_{0-N}$) contain associated color designations, B (black) and W (white). Thus, the triangle 30 to be rendered on the two-dimensional space is part of a larger object to be displayed in shades of gray.

As illustrated in FIG. 1, the line segments that define the triangle 30 intersect and are contained within a plurality of pixels. An example of such pixel is shown encircled at 31.

The appearance of the portion of the triangle 30 contained within pixel 31 is determined by sampling the pixel and interpolating the appearance thereof based on the appearance value associated with the three vertices of the triangle.

Figure 2:
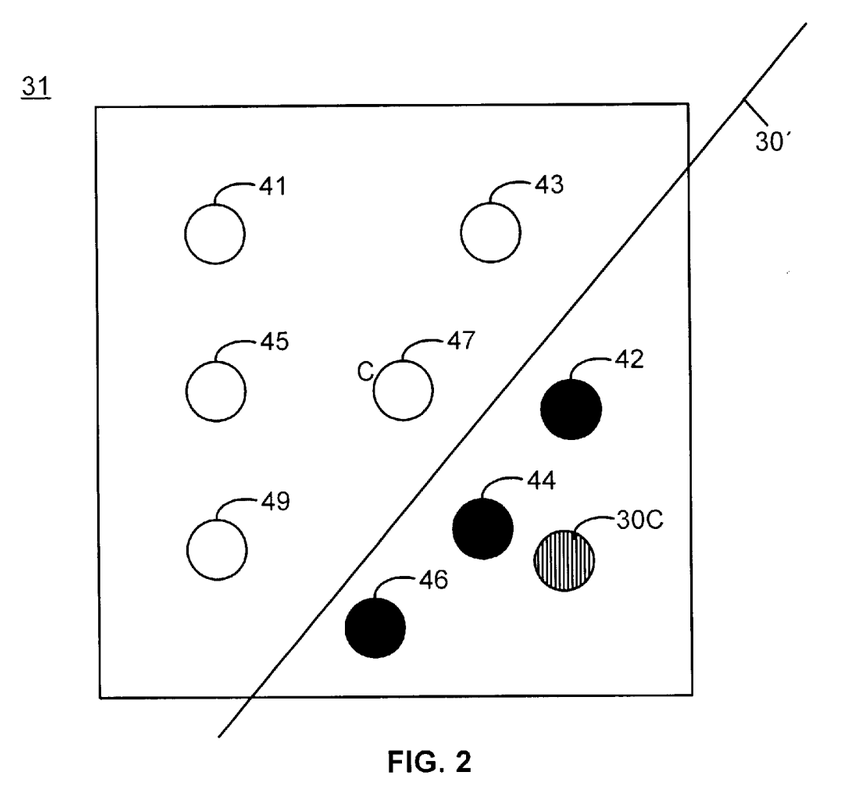
FIG. 2 is an exploded view of a pixel containing a fragment of the primitive to be sampled.

FIG. 2 is an exploded view of the pixel 31 that is intersected by line segment 30' of the primitive. As illustrated, FIG. 2 shows a plurality of sample points 41–49 that are present within the pixel 31. These sample points are provided, for example, by coverage mask logic 54 (FIG. 4), which is part of a larger multisampling rendering engine (not shown). The sample points 41–49 are fixed with respect to each individual pixel 31. Thus, it can be readily determined as to which sample points lie within the fragment. As shown in FIG. 2, the darkened circles corresponding to sample points 42, 44 and 46, represent sample points that are within the fragment. In contrast, empty circles corresponding to sample points 41, 43, 45, 47 and 49 lie outside of the fragment to be rendered. Conventional sampling methods require the sampling of the pixel 31 to occur at the center point (labeled "C") thereof. However, in those situations as illustrated in FIG. 2 where the fragment to be rendered does not cover the center of the pixel 31, conventional sampling methods result in artifacts being present in the subsequently rendered image. These artifacts cause wrongfully colored or otherwise degraded points or lines to appear on a display as the primitive, or portion thereof, contained within the pixel was not properly sampled. Consequently, conventional sampling techniques often result in images that show visual artifacts on a display. An illustration of such a degraded image caused by improperly sampled pixels is shown in FIG. 3.

Figure 3:
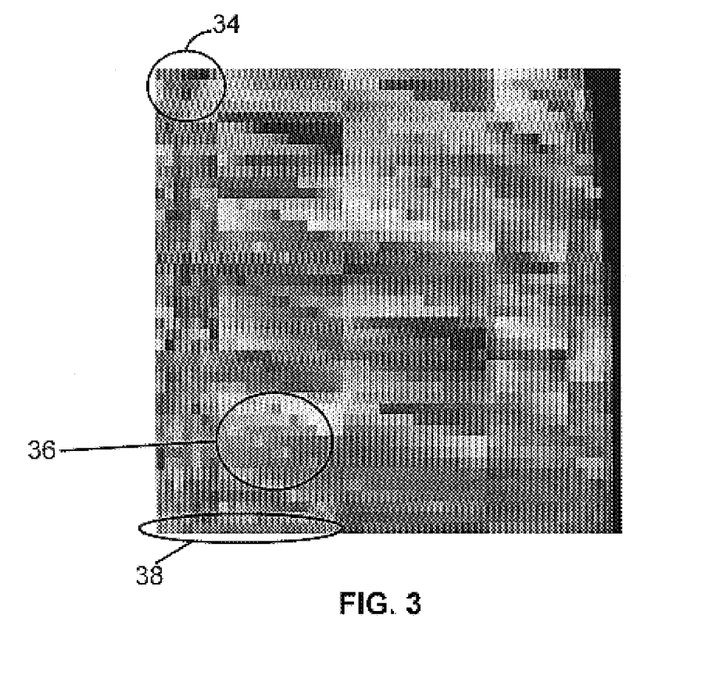
FIG. 3 is a graphical representation of rendered pixels after being sampled by conventional sampling techniques.

As shown in greater detail in FIG. 3, the positions labeled 34, 36 and 38 represent pixels where the fragments contained therein were not sampled at their centroids, but were instead sampled at the center of the corresponding pixels. Those sampled pixel locations generate artifacts (as shown, for example, at 34) that will subsequently be rendered as wrongfully colored pixels on a display.

In contrast, the present invention is directed to a method and apparatus which substantially reduces or eliminates the artifacts caused by a fragment not being completely sampled by the graphics processor. According to the present invention, the sampling of a pixel is performed at the centroid of the fragment present within the pixel. By sampling at the centroid of the fragment, artifacts, particularly those present at the borders of primitives, are negated. Thereby, resulting in a sharper, more clearly rendered image. The centroid sampling method and an exemplary circuit configured to perform the sampling operation will now be described with reference to FIGS. 4–7.

Figure 4:
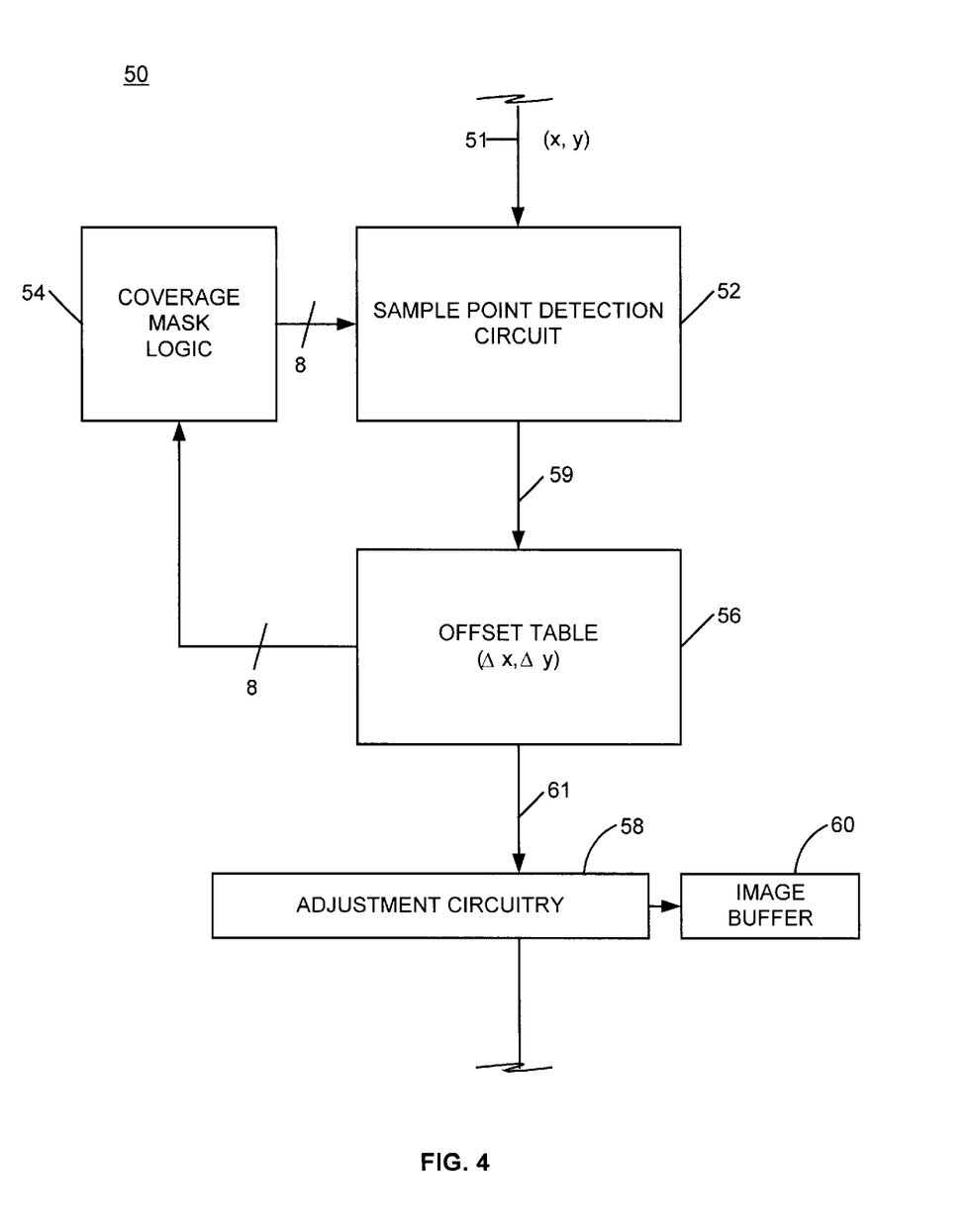
FIG. 4 is a block diagram of the centroid determination circuit which performs the fragment centroid determination according to the present invention.

FIG. 4 is a schematic representation of a centroid determination circuit 50 that determines the centroid of a fragment to be sampled according to the method of the present invention. In an exemplary embodiment, the centroid determination circuit 50 is part of a larger multisampling graphics processing circuit (not shown). The circuit includes a sample point detection circuit 52, an offset table 56 and adjustment circuitry 58. Also included in the centroid determination circuit 50 is coverage mask logic 54 which provides the sampling points of the particular pixel of interest and an image buffer 60 which is used to maintain the sampling position information after the pixel has been sampled at the fragment centroid. The offset table 56 may be stored within the graphics processing circuit, a stand alone component or a corresponding memory thereof. Such a memory may include a ROM, RAM, floppy disk, hard drive and/or any storage medium that stores digital information.

The sample point detection circuit 52 receives as a first input the initial center position 51 (defined by Cartesian coordinates x, y) of the pixel 31 of interest. A second input to the sample point detection circuit 52 is the coverage mask information which is provided by the coverage mask logic 54. In application, there is a coverage mask associated with each pixel with each coverage mask containing a plurality of sample points. After receiving the sets of input data, the sample point detection circuit 52 uses the fixed sampling point locations provided by the coverage mask logic 54 to determine which of the sampling points are contained within the fragment to be rendered and which of the sampling points are outside of the fragment to be rendered. By determining which of the sampling points are within the fragment, a coverage mask value is generated which is then transmitted to the offset table 56 on line 59.

Figure 5:
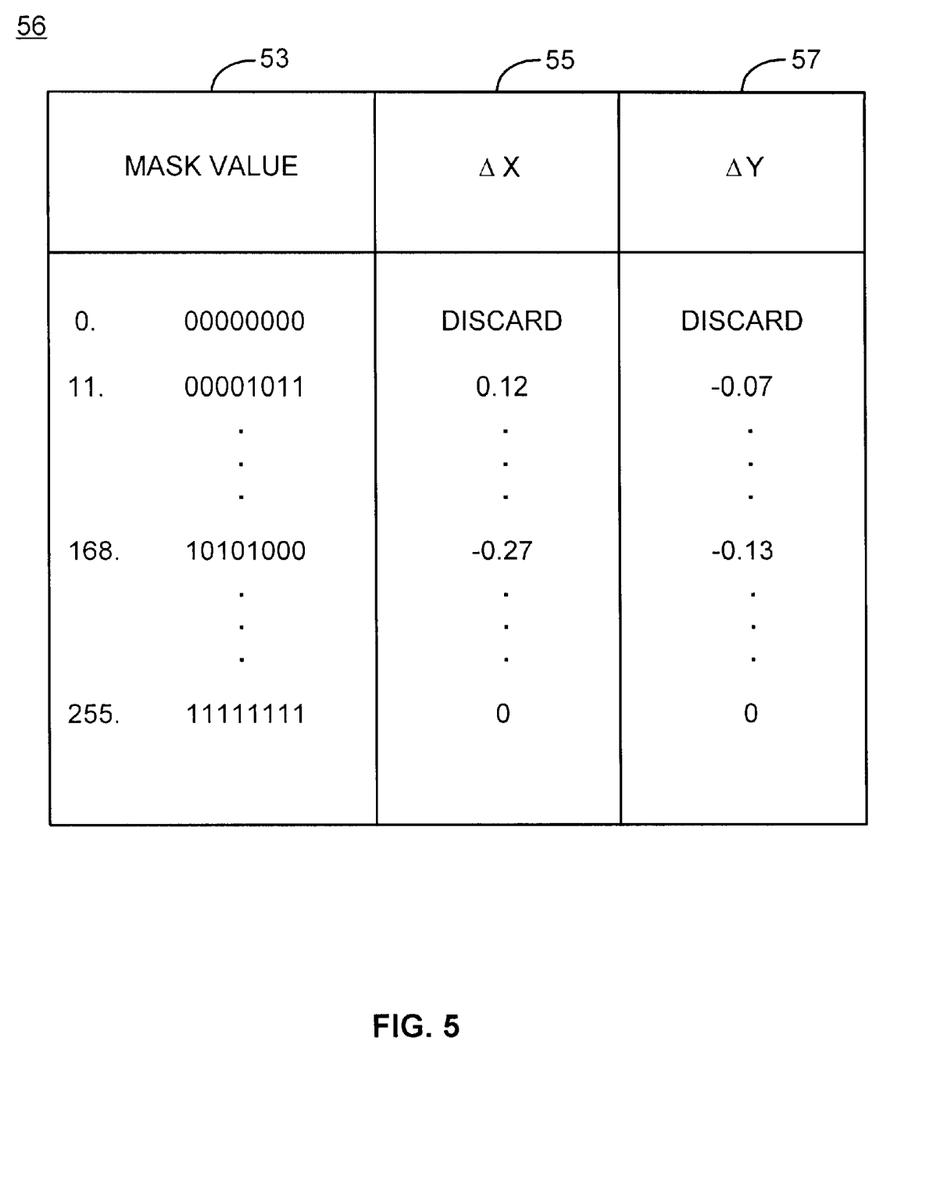
FIG. 5 is a schematic representation of the centroid offset table according to the present invention.

Referring briefly to FIG. 5, an exemplary offset table 56 will now be discussed. As illustrated in FIG. 5, the offset table 56 is a look-up table (LUT) containing 256 entries. Each entry includes offset position information ($\Delta x$, $\Delta y$) relative to the Cartesian center of the pixel (C), that is indexed by the coverage mask value determined by the sample point detection circuit 52. The offset table comprises three columns: (1) a coverage mask value column 53 which contains the 256 different indices based on the sampling points provided by the coverage mask logic 54; (2) an x-direction ($\Delta x$) shift column 55 containing values indicating how much the initial sampling point needs to be shifted in the x-direction to position the sampling point at the centroid of the fragment based on the calculated coverage mask value; and (3) a y-direction ($\Delta y$) shift column 57 containing values indicating how much the initial sampling point needs to be shifted in the y-direction to position the sampling point at the centroid of the fragment based on the calculated coverage mask value. The use and significance of the values maintained within the LUT will be described in greater detail below.

Referring back to FIG. 4, the appropriate x-direction and y-direction shifting values ($\Delta x$, $\Delta y$) are then transmitted to the adjustment circuitry 58 on line 61, where such shifting values are added to the initial sampling point (x, y) values to determine the centroid of the fragment where the proper sampling should be performed. The calculations performed by the adjustment circuitry 58 is provided in equation 1 below:

$$x_c = x + \Delta x, \quad y_c = y + \Delta y \qquad (1)$$

where $x_c$ represents the x-position of the centroid; $y_c$ represents the y-position of the centroid; $\Delta x$ represents the x-direction shift value from LUT 56; and $\Delta y$ represents the y-direction shift value from LUT 56.

Some multi-sample implementations use a plurality of different patterns for the positions of sample points within the pixel, in order to improve sampling quality. Each different pattern will have its own separate offset table 56. Similarly, different multi-sample implementations use different numbers of sample points per pixel. In general, if there are N sample points per pixel, the offset table requires $2^N$ entries.

Although described as being part of a larger graphics processor, those of ordinary skill in the art will appreciate that the centroid determination circuit 50 of the present invention, and the corresponding functionality thereof, can be implemented in a stand-alone or customized piece of hardware (i.e., ASIC) or program code that can be executed by a processing device. Such a processing device may be a microprocessor, microcomputer, digital signal processor, state machine and/or any device that manipulates signals based on operational instructions. As such, alternate applications and embodiments of the present invention are contemplated by and fall within the spirit and scope of the present invention. The operating steps performed by the centroid determination circuit 50 will now be described with reference to FIG. 6.

Figure 6:
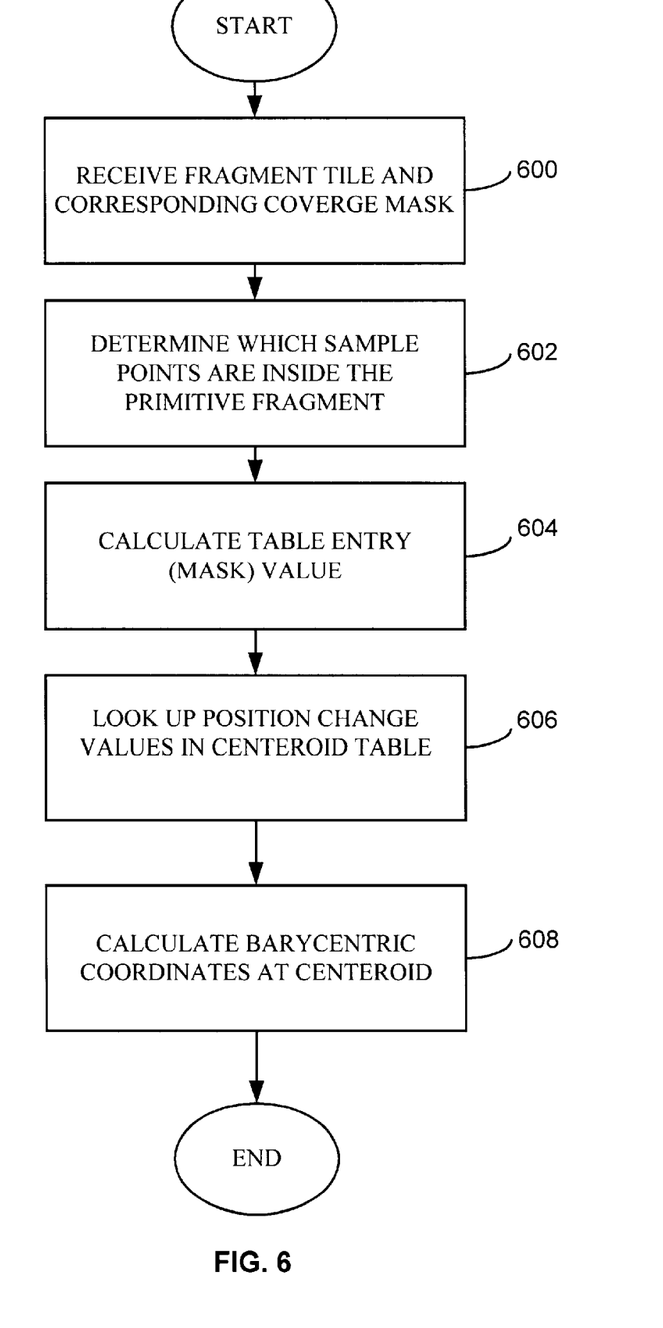
FIG. 6 is a flow chart illustrating the steps performed by the circuit of FIG. 4 when performing fragment centroid determination according to the present invention.

The fragment centroid determination method starts at step 600 where the sample point detection circuit receives the initial Cartesian center position of a pixel 31 under consideration and the coverage mask, containing a plurality of sampling points corresponding to that particular pixel from the coverage mask logic 54. Next, in step 602, the sample point detection circuit determines which sample points of the coverage mask are located inside the primitive fragment. Referring back to FIG. 2, this is done by assigning the binary value "0" to those sample points outside the fragment; and assigning the binary value "1" to those sample points within the fragment. Such assignment is accomplished by scanning the plurality of sample points from top to bottom. For example, sample points 41 and 43 will be labeled as a zero as both of these sample points lie outside of the fragment as represented by line segment 30'. Next, sample points 45 and 47 will also be labeled as a zero because they lie outside of the fragment bounded by line segment 30'. However, sample point 42 lies within the fragment bounded by 30' and will be labeled as a one. The next plurality of sample points are looked at and sample point 49 is labeled as a zero; sample point 44 is labeled as a one. Finally, sample point 46 is labeled as a one as it too falls within the fragment defined by line 30'.

Next, in step 604, a coverage mask value is calculated based on the assigned values of the sampling points defined in step 602. Once again referring to FIG. 2, the coverage mask value is determined by generating a binary value based on the assigned sampling point values from the top of the pixel 31 to the bottom of the pixel 31. Thus, the most significant bits of the binary coverage mask value will correspond to the values assigned to sampling points 41, 43, 45 and 47; the least significant bits of the coverage mask value will be provided by the values assigned to sampling points 42, 49, 44 and 46. Based on the previously assigned values, the coverage mask value of the sampling points of pixel 31 is $(00001011_b)=11$. Thus, the coverage mask value for pixel 31 equals 11.

In step 606, the coverage mask value determined in step 604 is transmitted to the offset table 56 on line 59 and is used to index position 11, within the LUT which corresponds to an x-direction ($\Delta$x) shift value of 0.12 and a y-direction ($\Delta$y) shift value of $-0.07$.

In step 608, the shift values ($\Delta$x, $\Delta$y) are then transmitted to the adjustment circuitry 58 on line 61 where such values are then added to the initial pixel center coordinates (x, y) as defined in equation (1), resulting in the actual centroid of the fragment present within pixel 31 being calculated. Thus, to sample pixel 31 at the fragment centroid, the initial sampling point must be shifted 0.12 grid coordinates in the x-direction and $-0.07$ grid coordinates in the y-direction, which corresponds to point 30C (FIG. 2).

After the fragment centroid has been determined in step 608, the sampling of corresponding pixels is conducted from the fragment centroid 30C by computing barycentric coordinates at the fragment centroid position rather than at the pixel center. Sampling from the fragment centroid enhances rendered image quality by ensuring that the fragment (or primitives) that comprise the rendered image are always completely sampled. This has the effect of substantially reducing or eliminating the artifacts, as compared to conventional sampling techniques, which are caused by the pixel being incompletely or improperly sampled. Thereby, resulting in a dramatic reduction in a number of wrongfully colored pixels on a display caused by such artifacts. The resulting image clarity is illustrated in FIG. 7.

Figure 7:
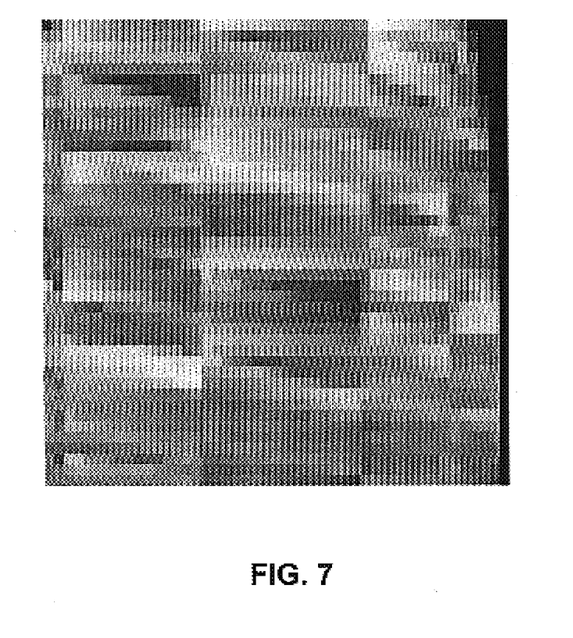
FIG. 7 is a graphical representation of rendered pixels after being sampled at the fragment centroid according to the present invention.

As shown, the number of artifacts present in the rendered image of FIG. 7 is substantially reduced as compared to the image presented in FIG. 3. Consequently, the resulting image generated from the pixels sampled at the fragment centroid according to the present invention will be much sharper and more vivid than the image resulting from pixels sampled according to conventional sampling methods, with fewer distracting errors.

The above detailed description of the invention and the examples described therein have been provided for the purposes of illustration and description. It is therefore contemplated that the present invention cover any and all modifications, variations and/or equivalents that fall within the spirit and scope of the basic underlying principles disclosed and claimed herein.

What is claimed is:

1. A method of computing the centroid of a fragment, comprising the steps of:
   (a) determining the center point of a pixel containing a fragment to be rendered;
   (b) receiving a coverage mask including a plurality of sample points;
   (c) determining a coverage mask value based on the number of sample points within the fragment;
   (d) determining fragment centroid offset values based on the coverage mask value of step (c); and
   (e) determining offset coordinates of the fragment centroid based on the fragment centroid offset values and the center point of the pixel containing a fragment to be rendered.

2. The method of claim 1, wherein the offset coordinates of step (e) are Cartesian values.

3. The method of claim 1, further including the step of (f) interpolating appearance parameters based on the fragment centroid.

4. The method of claim 3, further including the step of (g) rendering an image of the fragment based on the appearance parameters of step (f).

5. The method of claim 1, wherein the centroid offset values of step (d) are maintained in a table which is indexed by the coverage mask value.

6. The method of claim 5, wherein the offset values comprise position data representative of the amount of shifting required to move the pixel sample position from the center of the pixel to the centroid of the fragment.

7. The method of claim 6, wherein the amount of shifting provided by the offset values corresponds to x-position shifting and y-position shifting.

8. The method of claim 5, wherein the table maintaining the centroid offset values is a look-up table.

9. A method of computing the centroid of a fragment, comprising the steps of:
   (a) receiving the center point of a pixel containing a fragment to be rendered;
   (b) receiving a mask containing at least one sample point;
   (c) determining a coverage mask value based on the number of sample points present within a sample fragment;
   (d) determining fragment centroid offset values based on the coverage mask value; and (e) determining the fragment centroid value based on the offset values of step (d) and the center point of the pixel of step (a).

10. The method of claim 9, wherein the centroid offset value determination of step (d) further comprises the step of (d1) looking up the centroid offset values in a table indexed by the coverage mask value of step (c).

11. The method of claim 10, wherein the centroid value determination of step (e) further comprises the step of (e1) adding the centroid offset values to the center point of the fragment.

12. A circuit, comprising:
 a sampling circuit operative to sample a pixel;
 a coverage mask circuit operative to provide coverage mask sampling data for the pixel;
 a centroid determination circuit, coupled to the sampling circuit and the coverage mask circuit, operative to shift the sampling point of the pixel from the center of the pixel to the center of a fragment contained within the pixel, wherein the centroid determination circuit further includes an adjustment circuit operative to determine offset coordinates of the fragment centroid based on offset values which are added to the initial center point of the pixel, the centroid determination circuit further includes means for determining a coverage mask value based on the coverage mask sampling data wherein the offset values are determined based on the coverage mask value; and a pixel buffer, coupled to the centroid determination circuit, operative to store the pixel sampling data before the pixel is rendered.

13. The circuit of claim 12, further including a memory for storing the centroid offset values.

14. The circuit of claim 13, wherein the memory is a look-up table.

15. The circuit of claim 12, further including a rendering circuit for presenting the pixel sampling data to a display.

16. The circuit of claim 12, wherein the coverage mask values are used as an index to a look-up table, the look-up table containing the offset values.

17. The circuit of claim 12, wherein the sampling circuit samples the pixel at the calculated centroid.

\* \* \* \* \*